May 2, 1967  W. A. HENSLEY, JR  3,317,890

OVERWATER SEISMIC EXPLORATION METHOD AND APPARATUS

Filed March 22, 1965  4 Sheets-Sheet 1

INVENTOR
W. A. HENSLEY, JR.

BY

Young and Quigg
ATTORNEYS

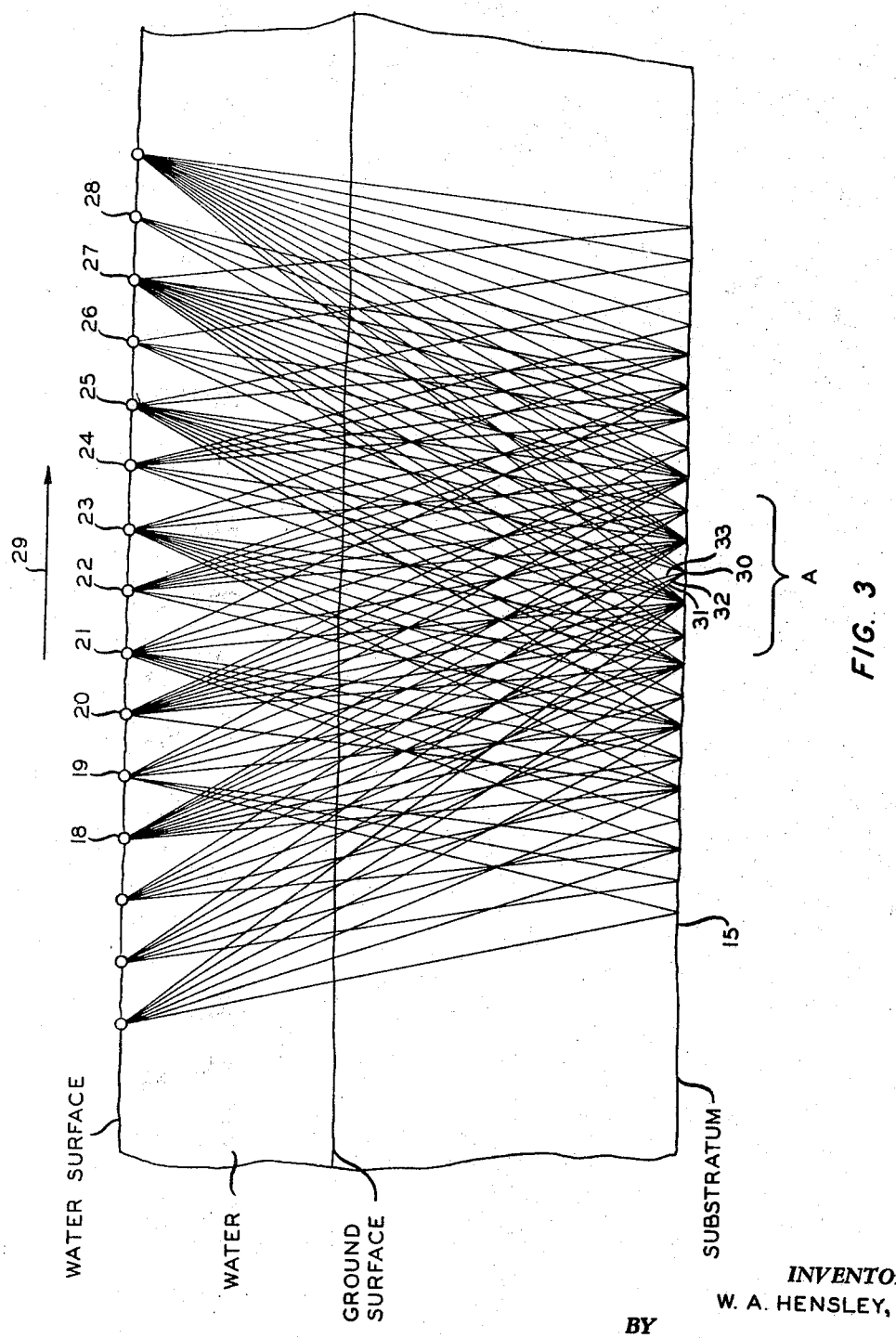

INVENTOR
W. A. HENSLEY, JR.
BY
Young and Quigg
ATTORNEYS

United States Patent Office 3,317,890
Patented May 2, 1967

3,317,890
OVERWATER SEISMIC EXPLORATION
METHOD AND APPARATUS
William A. Hensley, Jr., Bartlesville, Okla., assignor to Phillips Petroleum Company, a corporation of Delaware
Filed Mar. 22, 1965, Ser. No. 441,676
14 Claims. (Cl. 340—7)

This invention relates to an improved method and apparatus for seismic exploration.

Heretofore, in seismic exploration over water, it has been necessary to place long lines of seismometers on or in the water and to attempt to keep these lines in a specific position. The fixing and holding of these lines has been extremely difficult due to the vagrancies of currents in the water and due to interference caused by ships crossing the lines.

Heretofore, a line of seismometers was not pulled through the water during a seismic exploration operation due to the high frequency noise generated by the line as it moves through the water. Although specialized and expensive apparatus for reducing noise so produced and conventionally known as a streamer cable can be used, its filtering of high frequency noise can be improved. A full and complete disclosure of a conventional type streamer cable is set forth in U.S. Patent 2,465,696.

It has now been found that an improved method for water-borne seismic exploration is effected when the streamer cable is constructed so that it comprises a series of sections of seismic detectors, each section being of equal length and the number of sections in the series being equal to a whole even integer. It was found that the seismic exploration operation which involves detecting a plurality of seismic signals from a common locus in a subterranean formation to form a composite record, better known as the so-called "common reflection point" or "common depth point" or "stacking" technique, can be carried out while pulling the above series of sections of seismic detectors through the water. By this invention the seismic signals are created at either end of the series of sections of seismic detectors and at a fixed distance from those ends. This fixed distance is equal to the length of one of the sections in the series multiplied by a whole integer that can be divided into the total number of sections in the series to give a whole even integer. Each alternate seismic signal is created after the series of sections of seismic detectors is pulled the above fixed distance through the water and without slowing down the rate of travel of the series through the water. The reflected seismic signals are detected by the series and recorded and composited according to the above-mentioned technique.

It has further been found that the water-borne seismic exploration operations which utilize a streamer cable carrying a plurality of seismic detectors and pull same through the water can be improved as to their noise filtering effectiveness by interval-tuning the whole cable or by interval-tuning each separate section of seismic detectors, the detectors in each section being connected together to produce a single trace on a recording. This noise filtering is accomplished by spacing a first pair of seismic detectors on either side of the longitudinal center point of the cable or section and a known distance apart from one another, then spacing a second pair of detectors on either side of the first pair in a direction away from the center of the cable or section and at a distance equal to about 1.49 times the distance between the first pair of detectors. Similar spacing for a third and fourth pair of detectors complete the cable or section. The third pair of detectors are spaced from the second pair of detectors at a distance equal to about 1.99 times the distance between the first pair of detectors. The spacing of the fourth pair of detectors from the third pair of detectors is equal to about 2.49 times the distance between the first pair of detectors. Such an interval-tuned cable or section of cable effectively filters out high frequency noise generated by that cable being pulled through water during a seismic operation.

Accordingly, it is an object of this invention to provide a new and improved method for water-borne seismic exploration. Another object of this invention is to provide improved apparatus for seismic exploration.

Other aspects, objects and the several advantages of the invention will be apparent to those skilled in the art from the description, the drawings and the appended claims.

FIGURE 3 is a schematic representation of the signal paths obtained by the method of this invention.

Figure 1:
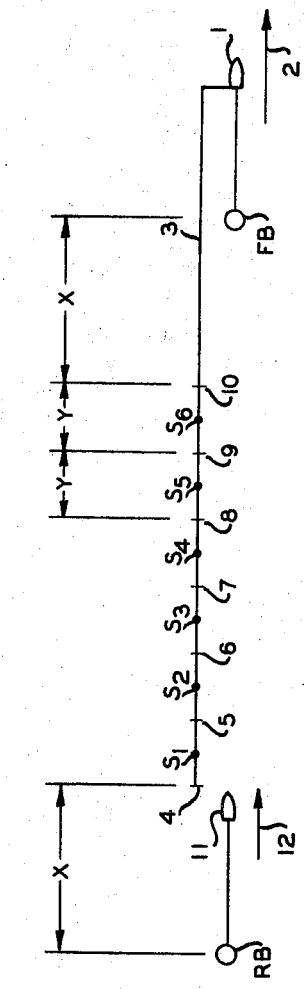
FIGURE 1 is a plan view of a two-boat system employing this invention.

Referring now to FIGURE 1 there is shown a boat 1 moving in the direction of arrow 2 and towing a streamer cable 3 and an explosive charge FB. Charge FB is an explosive or any other conventional type of device capable of creating seismic signals. Streamer cable 3 is composed of six seismic sections (seismometer stations) $S_1$, $S_2$ . . . and $S_6$. Each section contains a plurality of seismometers connected together to produce a single trace on the recording made on the instruments carried by boat 1. The sections are defined by the reference numerals 4, 5 . . . and 10. That is to say the section which is denoted as $S_1$ extends from reference numeral 4 to reference numeral 5. $S_2$ is defined by reference numerals 5 and 6 and so on. The number of seismometers in each equal length section can vary widely but generally will be from about 8 to about 24. The length of each section can also vary widely but generally will be about 150 feet. Similarly, the number of equal length sections can vary from 2 up to as large a number as desired but there will generally be in the neighborhood of about 24 such sections in a single cable. One or a plurality of cables can also be employed in a single operation.

A second charge RB which is similar to charge FB in the creation of seismic signals is towed by boat 11 which is moving in the direction of arrow 12. The spacing X between charges FB and RB from ends 4 and 10 (respectively) of streamer cable 3 is equal to the length Y of one of the equal length sections multiplied by a whole integer that can be divided into the total number of sections in streamer cable 3 to give a whole and even integer. Thus, in the case of FIGURE 1 where there are six sections the distance X can be either 1Y or 3Y since 1 can be divided into 6 to give the whole even integer 6 and 3 can be divided into 6 to give the whole even integer 2.

It can be seen from the above that the number of equal length sections present in the series must be a whole even integer. The following table indicates the relation between the number of sections present and the whole integer or integers that can be divided into the total number of sections to give a whole even integer:

TABLE I

| Number of sections: | Whole integer |
|---|---|
| 2 | 1 |
| 4 | 1, 2 |
| 6 | 1, 3 |
| 8 | 1, 2, 4 |

Although not shown in Table I, the number of sections can extend to as large a number as desired and the whole integers representative of the total number of sections will vary accordingly.

Figure 2:
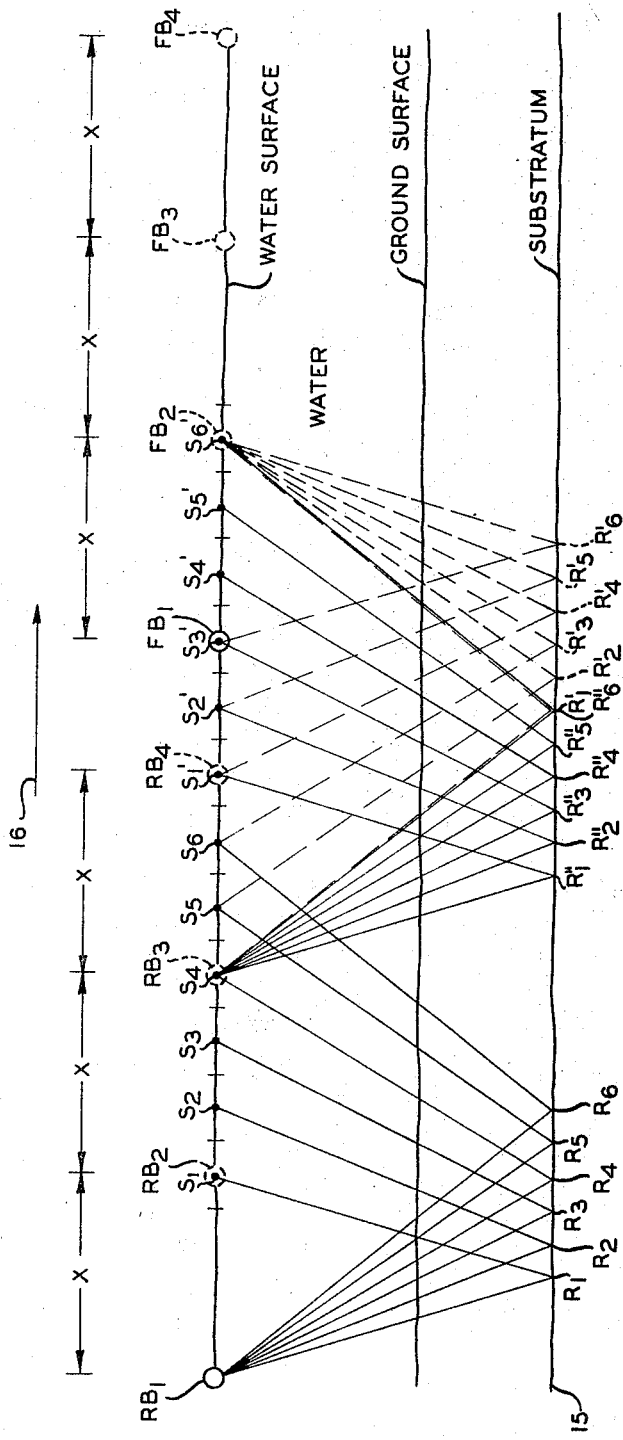
FIGURE 2 is a schematic representation of the locations of the shot points and seismometers employed in the system of FIGURE 1.

In FIGURE 2 there is shown a sequence of movement of boats 1 and 11 and the alternate detonation of charges FB and RB when following the method of this invention. At the outset the charge towed by boat 1 is located at $FB_1$ and the charge towed by boat 11 is at $RB_1$. At this point $RB_1$ is detonated and the seismic signals so generated are reflected from points $R_1, R_2 \ldots$ and $R_6$ from a subterranean reflecting bed 15 to sections $S_1, S_2 \ldots$ and $S_6$ in streamer cable 3. The two charges and streamer cable 3 are then pulled a distance X in the direction of arrow 16 to the reference numerals $RB_2$ and $FB_2$ at which point seismic signals are generated at $FB_2$ and reflected at points $R'_1, R'_2 \ldots$ and $R'_6$ to the six sections of streamer cable 3 now represented on the figure as $S_4, S_5, S_6, S'_1, S'_2$ and $S'_3$ ($S_4$ being none other than $S_1$ moved a distance X in the direction of arrow 16). The two charges RB and FB and streamer cable 3 are then moved forward a distance X as represented by $RB_3$ and $FB_3$ at which time the rear charge $RB_3$ is detonated and the seismic signals created reflected at points $R''_1, R''_2 \ldots$ and $R''_6(R'_1)$ to the sections of the streamer cable 3 represented by $S'_1, S'_2 \ldots$ and $S'_6$ ($S'_1$ being none other than S moved a distance X in the direction of arrow 16).

Although for the sake of clarity the creation of the seismic signals $RB_1$, $RB_3$ and $FB_2$ have been shown at the surface of the water, it is to be understood that the streamer cable 3 when pulled through the water can be either on the surface or under the surface of the water and is preferably about 30 feet below the surface of the water. The same applies to the charges at $RB_{11}$, $FB_1$, etc., which preferably are placed below the surface of the water.

In FIGURE 3 there is shown an example of signal path pattern and overlapping of patterns at common reflection points in a two-boat system such as that shown in FIGURE 1 wherein there are 24 equal length sections and X is equal to the length of one section multipled by the whole integer 2. Reference numerass 18 through 28 represent successive shot points made during the travel of streamer cable 3 in the direction of arrow 29. Due to practical limitations, all alternate shot points extending on either side of reference numerals 18 and 28 are not shown; however, the composite result of shot points 18 through 28 and those extending on either side of shot points 18 and 28 is that a single locus 30, for example, in subterranean reflector bed 15 has impinged thereon several seismic signals 31, 32 and 33 each of which was produced at a different distance from locus 30 and recorded at a different distance from locus 30 and therefore can be composited in accordance with known techniques such as the so-called "common reflection point" technique. A full and complete disclosure of such a technique including the reproduction and combination of a multiplicity of signals from a single locus is set forth in U.S. Patent 3,040,833, issued to Mendenhall et al. on June 26, 1962. For the extent of the drawing the area A has six-fold coverage, i.e., 3 rays from a front boat shot and 3 rays from a back boat shot.

Figure 4:
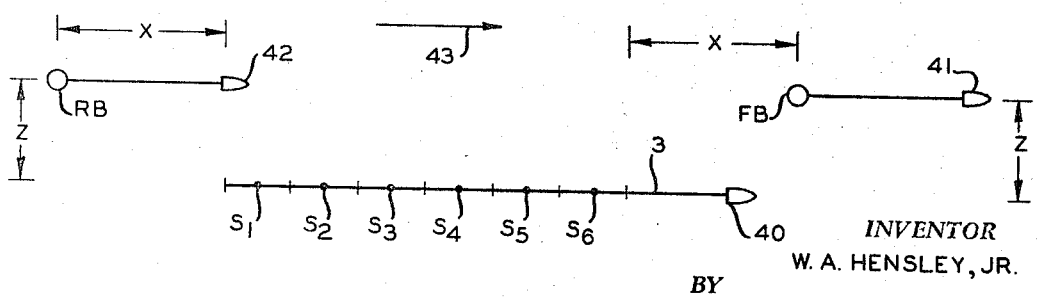
FIGURE 4 is a plan view of a three-boat system employing this invention.

FIGURE 4 shows a three-boat system which can be used to practice this invention. In this system boat 40 pulls streamer cable 3 while boats 41 and 42 charge FB and RB, respectively, X distance from either end of streamer cable 3 and Z distance from and on the same side of streamer cable 3. Boats 40, 41 and 42 all travel in the direction of arrow 43. The distance Z can be any desired distance as long as both of the charges RB and FB are that same distance removed from streamer cable 3 and on the same side of streamer cable 3. In practicing the three-boat system the distance X is determined in the same manner described above with reference to FIGURE 1.

Figure 5:
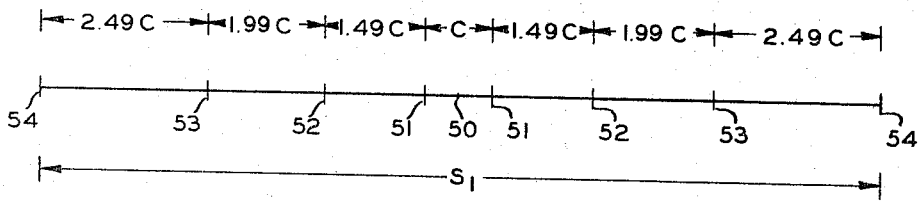
FIGURE 5 is a plan view of a section of seismic detectors interval-tuned in accordance with this invention.

In FIGURE 5 section $S_1$ is shown in detail employing the interval-tuned array of seismometers according to this invention. It is to be understood that although the sections in streamer cable 3 can employ seismometers arranged in any desired array including equal spacing thereof, it has been found that high frequency noise is effectively filtered out by the array shown in FIGURE 5.

In FIGURE 5 center point 50 of section $S_1$ has disposed on either side thereof a first pair of seismometers 51, 51. The total distance C between seismometers 51, 51 has its midpoint at 50. The distance C is preferably 2.4 meters or 7.9 feet. A second pair of seismometers 52, 52 are disposed a distance of about 1.49 C on either side of seismometers 51, 51. A third pair of seismometers 53, 53 are disposed a distance of about 1.99 C on either side of seismometers 52, 52. A fourth pair of seismometers 54, 54 are disposed a distance of about 2.49 C on either side of seismometers 53, 53.

Figure 6:
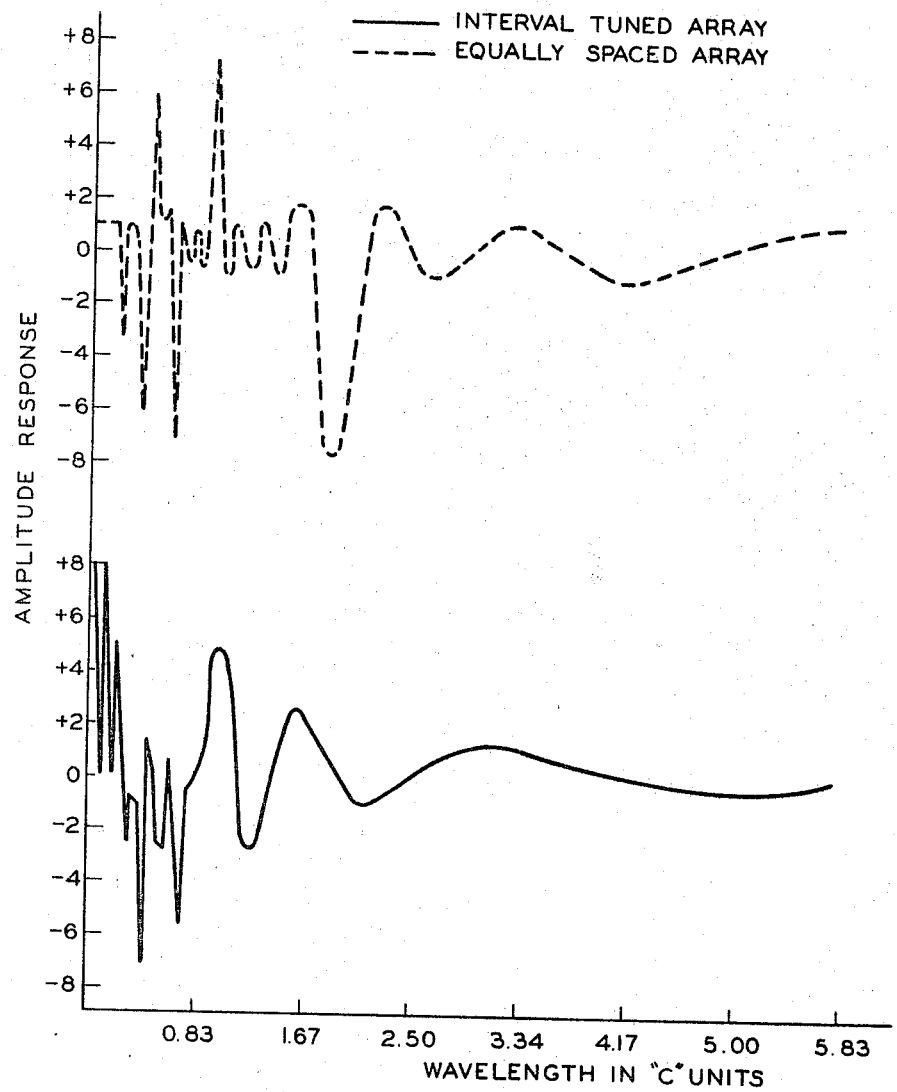
FIGURE 6 is a graphical representation of operating features of the method of this invention and the section of FIGURE 4.

FIGURE 6 compares the interval-tuned array of FIGURE 5 with the conventional equally spaced array of seismometers and indicates that in the short wave length of 1.67 to 5.83 "C" units, i.e. 4 to 14 meters, the interval-tuned array indicates a relatively uniform and low response. In comparison, the equally spaced array shows a substantially less uniform and a higher response thus indicating less filtering of short wave length noise. The wave length L referred to here is measured along the line of the array. Thus, the relation of frequency $f$ to wave length depends on the angle $\theta$ between the line of profile (array) and the direction of propagation of the wave energy. For vertical propagation (seismic signals) the angle is 90°. For horizontal in line propagation (streamer cable noise) the angle is 0° or 180°. In any case, $$L = \frac{v}{f \cos \theta}$$

where $v$ is the velocity of sound in water.

Figure 7:
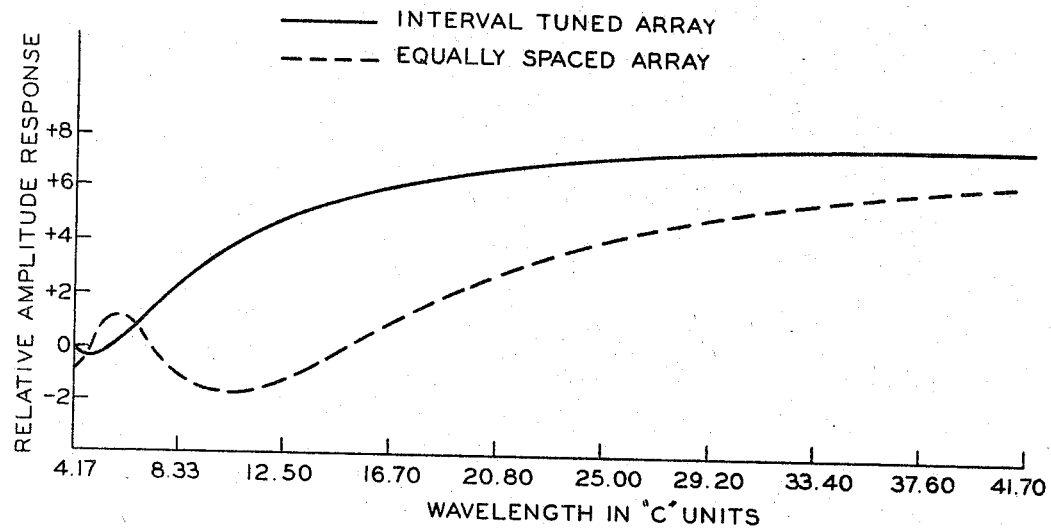
FIGURE 7 is an additional graphical representation of operating features of the method of this invention and the section of FIGURE 5.

FIGURE 7 compares the interval-tuned array and equally spaced array of FIGURE 6 at lower frequency range, i.e. longer wave length of from 8.33 to 41.70 "C" units, i.e. 20 to 100 meters, or those frequencies in the range encountered in seismic exploration. It can be seen that the response of the interval-tuned array rises rapidly to the half power point, i.e. 3 decibels, at about 14.60 "C" units, i.e. 35 meters. In comparison, the equally spaced array's response rises more slowly reaching the half-power point, i.e. 3 decibels, at 33.40 "C" units, i.e. 80 meters. Thus, the interval-tuned array is significantly more responsive in the lower frequency range.

It can thus be seen that short wave length noise such as that created by towing a cable of water and which propagates in a direction parallel to the longitudinal axis of the cable, as opposed to the long wave length seismic signals which propagate in a direction perpendicular to the longitudinal axis of the cable, are filtered to a large extent by the interval-tuned array of this invention; thus, conventional seismic signals having a wave length of 35 meters or above and which are to be detected after reflection by the interval-tuned array are more effectively discriminated by this array from the above high frequency noise. Thus, although not limited thereto, the interval-tuned array of this invention is well suited for use in continuous water-borne seismic operations such as those disclosed above and others. It is to be understood that although the application of the interval-tuned array of this invention has been described with reference to water-borne seismic operations, the array can be employed in overland exploration also.

Generally, any type of conventional streamer cable and seismometers, commonly pressure-type seismometers, can be employed in the practice of this invention. The same also applies to apparatus for the creation of seismic signals.

*Example I*

A conventional streamer cable was divided into 24 equal length sections, each section being 150 feet in length and having 8 equally spaced seismometers in each 150-foot section connected together to produce a single trace on a recording for each section. Two boats were employed, a first boat carrying the recording instruments and one set of shooting apparatus, towing the 3600-foot streamer cable. The section closest to the first boat is 600 feet from the rear of that boat. A conventional charge of 16 to 100 pounds of dynamite is towed 300 feet from the rear of the first boat but spaced laterally at least 25 to 100 feet from the cable connecting the first boat to the streamer cable. The second boat follows the first boat at the end of the towed streamer cable and tows 300 feet behind it a charge of dynamite similar to that towed behind the first boat. The two boats travel in a straight line through the water at a speed of about 4 to 8 knots and alternate the detonation of the towed charges of dynamite every 300 feet of forward travel so that each boat, in effect detonates a charge every 600 feet of travel of that boat. The streamer cable which floats about 30 feet below the surface of the water thus has alternately created at each end thereof seismic signals at the end of each 300 feet of forward travel of that cable and continuously detects reflected seismic signals while being pulled through the water in the above manner. The path of the seismic signals of this method are similar to, but more extensive than, those shown in FIGURE 3 and are therefore ideally suited to be composited in the manner of the above-mentioned "common reflection point" and similar techniques.

*Example II*

The method of Example I is carried out except that each section of the cable in which the 8 seismometers are connected together to produce a single trace on a recording are interval-tuned in an array similar to that shown in FIGURE 5 where C equals 7.9 feet. Thus, the first pair of seismometers are 7.9 feet apart, the second pair of seismometers are 11.8 feet on either side of the first pair of seismometers, the third pair of seismometers are 15.8 feet on either side of the second pair of seismometers and the fourth pair of seismometers are 19.7 feet on either side of the third pair of seismometers.

When amplitude response measurements are made of one of the interval-tuned sections of the streamer cable, there is obtained the graph set forth in FIGURE 6 which favorably compares with a graph obtained by similar measurements conducted on a section in which the seismometers are equally spaced, i.e. a section of the streamer cable of Example I. Similarly, the interval-tuned array graph of FIGURE 7 is also obtained at the same time the interval-tuned array of FIGURE 6 is made. The comparison graph in FIGURE 7 for the equally spaced array is also obtained from a section of the streamer cable of Example I and at the same time the equally spaced array graph of FIGURE 6 is made.

Thus, as discussed above and shown in FIGURES 6 and 7 the interval-tuned array of this invention provides very effective filtering for the elimination of short wavelength noise from longer wavelength seismic signals. Although such an arrangement is suited for any type of water or land seismic operation, it is ideally suited for water-borne operations which, if continuous, inherently generate additional high frequency noise.

Reasonable variations and modifications are possible within the scope of this disclosure without departing from the spirit and scope of the invention.

I claim:

1. An improved method for water-borne seismic exploration comprising pulling a series of sections of seismic detectors through the water, all of said sections being of equal length and the total number of said sections in said series being equal to a whole even integer, alternately creating seismic signals at a fixed distance from either end of said series as it is pulled through said water, said fixed distance being X, such that $X=Y(i)$, Y is the length of one of said sections and $i$ is a whole integer that can be divided into the said total number of sections in said series to give a whole even integer, each seismic signal being created after said series has been pulled said fixed distance through said water following the next preceding created seismic signal, detecting the reflected seismic signals with said series and recording and compositing same.

2. An improved method for water-borne seismic exploration which utilizes the detection of a plurality of seismic signals from a common locus in a subterranean formation to form a composite record comprising pulling a series of sections of seismic detectors through the water, all of said sections being of equal length and containing a plurality of seismic detectors connected together to produce a single trace on a recording and the total number of said sections in said series being equal to a whole even integer, alternately creating seismic signals at a fixed distance from either end of said series as it is pulled through said water, said fixed distance being X, such that $X=(Y)i$, wherein Y is the length of one of said sections and $i$ is a whole integer that can be divided into said total number of sections in said series to give a whole even integer, each seismic signal created after said series has been pulled said fixed distance through said water following the next preceding created seismic signal, detecting the reflected seismic signals with said series of sections of seismic detectors, forming a recording from each section and compositing the recordings from each section into a single record.

3. The method of claim 2 wherein said total number of sections is 24, said length of one of said sections is 150 feet, said fixed distance is 300 feet and the number of said plurality of seismic detectors in each section is from 8 to 20 seismometers.

4. An improved method for seismic exploration utilizing a plurality of seismic detectors comprising interval-tuning said plurality of detectors to filter out high frequency noises by spacing a first pair of detectors on either side of the center point of the plurality and a known distance apart, spacing a second pair of detectors on either side of said first pair in a direction away from the said center point and at a distance equal to about 1.49 times said known distance between said first pair, spacing a third pair of detectors on either side of said second pair in a direction away from said center point and at a distance equal to about 1.99 times said known distance between said first pair, spacing a fourth pair of detectors on either side of said third pair in a direction away from said center point and at a distance equal to about 2.49 times said known distance between said first pair and employing said interval-tuned array in seismic exploration operations.

5. The method according to claim 4 wherein said seismic exploration operation is water-borne.

6. An improved method for water-borne seismic exploration utilizing at least one section of seismic detectors containing a plurality of said detectors connected together to produce a single trace on a recording comprising interval-tuning said at least one section to filter out high frequency noise travelling along the length of said section by spacing a first pair of detectors on either side of the center point of the plurality and a known distance apart, spacing a second pair of detectors on either side of said first pair in a direction away from the said center point and at a distance equal to about 1.49 times said known distance between said first pair, spacing a third pair of detectors on either side of said second pair in a direction away from said center point and at a distance equal to about 1.99 times said known distance between said first pair, spacing a fourth pair of detectors on either side of said third pair in a direction away from said center point and at a distance equal to about 2.49 times said known distance between said first pair and employing said interval-tuned array in seismic exploration operations.

7. The method according to claim 6 wherein said known distance between said first pair of detectors is about 7.9 feet.

8. An improved method for water-borne seismic exploration comprising pulling a series of sections of seismic detectors through the water, each section containing a plurality of seismic detectors interval-tuned by spacing a first pair of detectors on either side of the center point of said section in a known distance apart, spacing an equal pair of detectors on either side of said first pair in a direction away from said center point and at a distance equal to about 1.49 times said known distance by said first pair, spacing a third pair of detectors on either side of said second pair in a direction away from said center point and at a distance equal to about 1.99 times said known distance, spacing a fourth pair of detectors on either side of said third pair in a direction away from said center point and at a distance equal to about 2.49 times said known distance, all of said sections being of equal length and the total number of said sections in said series being equal to a whole even integer, alternately creating seismic signals at a fixed distance from either end of said series as it is pulled through said water, said fixed distance being X, such that $X=(Y)i$, wherein Y is the length of one of said sections and $i$ is a whole integer that can be divided into said total number of sections in said series to give a whole even integer, each seismic signal being created after said series has been pulled said distance through said water following the next preceding created seismic signal, detecting the reflected seismic signals with said series of sections of seismic detectors and recording and compositing same.

9. The method according to claim 8 wherein said known distance between said first pair of detectors is about 2.4 meters.

10. An improved method for water-borne seismic exploration which involves detecting a plurality of seismic signals from a common locus in a subterranean formation to form a composite record comprising pulling a series of sections of seismic detectors through the water, each section containing a plurality of seismic detectors connected together to produce a single trace on a recording and interval-tuned to filter out high frequency noise travelling along the longitudinal axis of said section by spacing a first pair of detectors about 3.9 feet on either side of the center point of said section so that said detectors are about 7.9 feet apart, spacing a second pair of detectors about 11.8 feet on either side of said first pair in a direction away from said center point, spacing a third pair of detectors about 15.8 feet on either side of said second pair in a direction away from said center point, spacing a fourth pair of detectors about 19.7 feet on either side of said third pair in a direction away from said center point all of said sections being 150 feet in length and the total number of said sections being 24, alternately creating seismic signals 300 feet from either end of said series as it is pulled through said water, each seismic signal being created after said series has been pulled 300 feet through said water following the next preceding created seismic signal, detecting the reflected seismic signals with said series of sections of seismic detectors and recording and compositing same.

11. An improved seismic apparatus comprising a cable, a first pair of seismic detectors equally spaced on either side of a longitudinal center point of said cable and therefore a known distance apart, a second pair of detectors on either side of said first pair away from said center point and at a distance equal to about 1.49 times said known distance between said first pair, a third pair of detectors on either side of said second pair away from said center point and at a distance equal to about 1.99 times said known distance between said first pair and a fourth pair of detectors on either side of said third pair away from said center point and at a distance equal to about 2.49 times said known distance between said first pair.

12. The apparatus according to claim 11 wherein said seismic cable is a streamer cable for water-borne seismic exploration.

13. An improved seismic apparatus comprising a cable, a first pair of seismic detectors spaced an equal distance on either side of the longitudinal center point of said cable and about 7.9 feet apart, a second pair of detectors on either side of said first pair in a direction away from said center point and at a distance from said second pair equal to about 11.8 feet, a third pair of detectors on either side of said second pair in a direction away from said center point and at a distance from said second pair equal to about 15.8 feet, a fourth pair of detectors on either side of said third pair in a direction away from said center point and at a distance from said third pair equal to about 19.7 feet.

14. The apparatus according to claim 13 wherein said cable is a streamer cable for water-borne seismic exploration operations.

References Cited by the Examiner

UNITED STATES PATENTS

| | | | |
|---|---|---|---|
| 2,465,696 | 3/1949 | Paslay | 340—7 |
| 2,994,397 | 8/1961 | Huckabay | 340—7 X |
| 3,133,262 | 5/1964 | Strange | 340—7 |
| 3,208,548 | 9/1965 | Levin et al. | 181—.5 |

BENJAMIN A. BORCHELT, *Primary Examiner.*

SAMUEL FEINBERG, *Examiner.*

P. A. SHANLEY, *Assistant Examiner.*